United States Patent
Dederer et al.

(10) Patent No.: US 12,202,301 B2
(45) Date of Patent: Jan. 21, 2025

(54) TIRE PRESSURE MONITORING UNIT AND METHOD FOR MANAGING TIRE DATA IN A TIRE PRESSURE MONITORING UNIT

(71) Applicant: Huf Baolong Electronics Bretten GmbH, Bretten (DE)

(72) Inventors: Carsten Dederer, Sinsheim (DE); Christian Walter, Illingen (DE)

(73) Assignee: Huf Baolong Electronics Bretten GmbH, Bretten (DE)

( * ) Notice: Subject to any disclaimer, the term of this patent is extended or adjusted under 35 U.S.C. 154(b) by 381 days.

(21) Appl. No.: 17/456,429

(22) Filed: Nov. 24, 2021

(65) Prior Publication Data

US 2022/0080788 A1    Mar. 17, 2022

Related U.S. Application Data

(63) Continuation of application No. PCT/EP2020/063669, filed on May 15, 2020.

(30) Foreign Application Priority Data

May 29, 2019    (DE) .................... 10 2019 114 444.2

(51) Int. Cl.
*B60C 23/04*    (2006.01)
(52) U.S. Cl.
CPC ...... *B60C 23/0474* (2013.01); *B60C 23/0462* (2013.01); *B60C 23/0484* (2013.01)
(58) Field of Classification Search
CPC ............ B60C 23/0474; B60C 23/0462; B60C 23/0484
See application file for complete search history.

(56) References Cited

U.S. PATENT DOCUMENTS

2006/0015225 A1* 1/2006 McQuade ........... B60C 23/0408
                                                                  701/32.9
2010/0256946 A1* 10/2010 Carresjo ............. B60C 23/0474
                                                                  702/138

(Continued)

FOREIGN PATENT DOCUMENTS

DE       102007060861 A1 *  6/2009  ......... B60C 23/0408
DE     10 2016 105 427 A1      9/2017

(Continued)

*Primary Examiner* — Khoi H Tran
*Assistant Examiner* — Dairon Estevez
(74) *Attorney, Agent, or Firm* — Orbit IP, LLP; Marc G. Martino

(57) ABSTRACT

A tire pressure monitoring unit is for mounting on a vehicle wheel, having a sensor for measuring the tire pressure, a transmitter and a receiver for wireless data transmission, a memory for storing tire data, and a controller connected to the sensor, the transmitter, the receiver and the memory. The controller writes this tire data into the memory on receipt of tire data received via the receiver and assigns a value to a variable, the value marking this tire data as valid. It is provided that a necessary condition for the variable to be assigned a value which marks the tire data as invalid is that the controller detects a pressure increase that exceeds a predetermined threshold value. In addition, a corresponding method for managing tire data in a data memory of a tire pressure monitoring unit is described.

7 Claims, 1 Drawing Sheet

(56) References Cited

U.S. PATENT DOCUMENTS

2016/0272017 A1* 9/2016 Ghannam ............. B60T 8/1725
2018/0297422 A1* 10/2018 Ciovnicu .......... B60C 23/00318
2020/0307326 A1* 10/2020 Loeffler ............. B60C 23/0471

FOREIGN PATENT DOCUMENTS

| DE | 102017212932 A1 * | 1/2019 | ............. B60S 5/046 |
| EP | 2 217 457 A1 | 8/2010 | |
| JP | 2009119887 A * | 6/2009 | |
| WO | WO-2015076199 A1 * | 5/2015 | ........... B60C 23/061 |

* cited by examiner

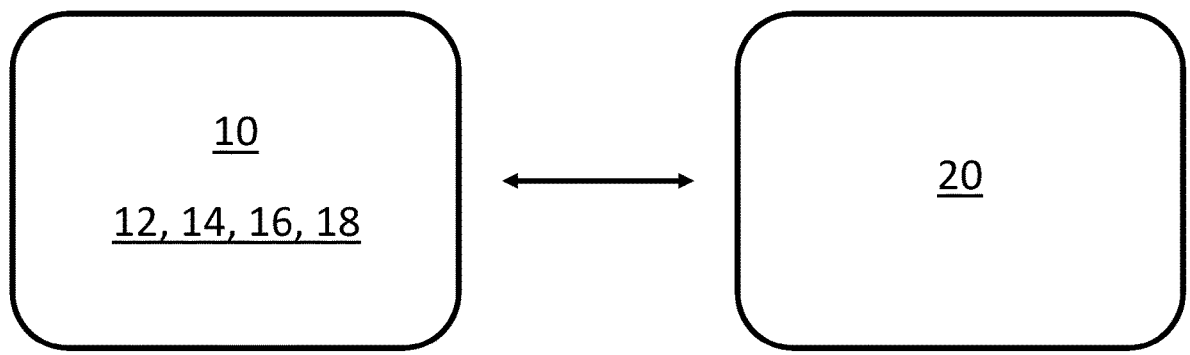

TIRE PRESSURE MONITORING UNIT AND METHOD FOR MANAGING TIRE DATA IN A TIRE PRESSURE MONITORING UNIT

CROSS-REFERENCE TO RELATED APPLICATIONS

This continuation application claims priority to PCT/EP2020/063669 filed on May 15, 2020 which has published as WO 2020/239479 A1 and also the German application number DE 10 2019 114 444.2 filed on May 29, 2019, the entire contents of which are fully incorporated herein with these references.

DESCRIPTION

Field of the Invention

The invention relates to a tire pressure monitoring unit which comprises a memory for storing tire data such as tire type and tire dimensions.

Background of the Invention

A tire pressure monitoring unit having the features specified in the preamble of claim 1 is known from EP 2 217 457 B1.

Tire data are written wirelessly to the memory of modern tire pressure monitoring units, for example, in the manner described in DE 10 2016 105 427 A1, and can then be made available by the tire pressure monitoring unit to a safety-relevant vehicle system, for example, an ABS control. In particular, in the case of tire pressure monitoring units that are mounted on a tire valve or a rim, after a tire change, tire data that do not match the tire that is currently being used with the tire pressure monitoring unit can still be stored in the memory of the tire pressure monitoring unit. In such a case, it must be ensured that safety-relevant vehicle systems do not work with outdated or incorrect tire data.

To solve this problem, it is known from EP 2 217 457 B1 to provide a flag in the memory of the tire pressure monitoring unit, the flag being set every time new tire data are written into the memory of the tire pressure monitoring unit and being cleared as soon as the pressure measured by the tire pressure monitoring unit falls below a predetermined threshold value. Since a tire change is necessarily associated with a pressure drop, it can thus be ensured that the flag is cleared each time a tire is changed and any tire data still stored in the tire pressure monitoring unit are then marked as unreliable by the cleared flag. When, after a tire change, it is forgotten to write new tire data into the tire pressure monitoring unit, it is therefore impossible for the old, now possibly incorrect, tire data to be used by a vehicle system.

SUMMARY OF THE INVENTION

An object of the present invention is to show an alternative way of reliably preventing vehicle safety systems from receiving incorrect tire data from a tire pressure monitor.

This object is achieved by a tire pressure monitoring unit having the features specified in the independent apparatus claim and by a method according to the independent method claim. Advantageous refinements of the invention are the subject of dependent claims.

BRIEF DESCRIPTION OF THE DRAWINGS

FIG. 1 is a schematic of an embodiment of the present invention.

DETAILED DESCRIPTION OF THE PREFERRED EMBODIMENTS

In the memory of a tire pressure monitoring unit according to the invention, each time tire data are written into the memory of the tire pressure monitoring unit, a value which marks the tire data as valid is assigned to a variable. This variable can be a flag, for example. According to the invention, a necessary condition for the variable being assigned a value which marks the stored tire data as invalid is that a pressure increase which exceeds a predetermined threshold value is detected.

In other words, in a tire pressure monitoring unit according to the invention, the variable can only be assigned a value which marks the stored tire data as invalid when a pressure increase which exceeds a predetermined threshold value is detected. However, the occurrence of a pressure increase that exceeds the predetermined threshold value does not necessarily mean that the variable is assigned a value which marks the stored tire data as invalid. The occurrence of a pressure increase that exceeds the predetermined threshold value is therefore not a sufficient condition for the variable to be assigned a value which marks the stored tire data as invalid.

When a tire is changed, tire data can be written into the tire pressure monitoring unit before or after the new tire is inflated. In both cases, a subsequent tire change can be detected by monitoring the tire pressure.

When tire data were written into the tire pressure monitoring unit before the tire was inflated, the first inflation of the tire is recognized by the fact that a pressure increase which exceeds a predetermined threshold value is detected in the tire. When a pressure increase that exceeds the predetermined threshold value is then detected a second time, there is a possibility that the tire has been changed. The tire data stored in the tire pressure monitoring unit are then unreliable and the variable is assigned a value which identifies the tire data as invalid, for example, in which the variable is a flag which is then cleared.

When the tire data were written into the tire pressure monitoring unit after the tire was inflated, the first pressure increase detected can already be the consequence of a tire change. In this case, however, the pressure increase must have been preceded by a corresponding pressure drop, since the tire data were only written into the tire pressure monitoring unit after the tire was inflated. The variable is therefore also assigned a value that identifies the tire data as invalid when, after the tire data has been written, a pressure drop that exceeds a second threshold value is detected, and then a pressure increase that exceeds the first threshold value.

The threshold values for a critical pressure increase and a critical pressure loss are to be selected as a function of the intended inflation pressure of a tire. What is important here is that by exceeding the first threshold value, it can be concluded that a flat tire has been inflated, and by exceeding the second threshold value, a complete loss of pressure, as inevitably occurs when a tire is changed.

In a tire pressure monitoring unit according to the invention, for example, a first flag can be provided which is set as soon as tire data are written into the memory of the tire pressure monitoring unit and is cleared when the tire data are recognized as invalid. A second flag can be set when a pressure increase which exceeds the first threshold value is detected or a pressure drop which exceeds the second threshold value is detected. The first flag is then cleared when a pressure increase that exceeds the first threshold value is detected and the second flag is already set.

A method according to the invention for managing tire data in a data memory of a tire pressure monitoring unit can be designed as follows, for example:

When a tire pressure monitoring unit receives tire data wirelessly via its receiver, for example, as described in DE 10 2016 105 427 A1, these tire data are stored in an electronic memory of the tire pressure monitoring unit and a variable is assigned a value that indicates that these tire data are new and valid. This variable can be a flag, for example.

The tire pressure is then monitored using the pressure sensor of the tire pressure monitoring unit. A basic idea of the present invention is that a tire change is always associated with a significant change in pressure. Removing an old tire is always associated with a drop in pressure and after fitting a new tire, it must be inflated so that a significant increase in pressure can be observed.

The controller of the tire pressure monitoring unit therefore checks whether a pressure increase which exceeds a predetermined threshold value occurs. For example, it can be checked whether the tire pressure increases by 200 kPa in less than 5 minutes.

Exceeding the predetermined threshold value is noted by the controller in the electronic memory of the tire pressure monitoring unit, for example, by setting a corresponding flag.

Invalidity of the tire data can then be recognized in different ways. One possibility is that such a pressure increase, which exceeds the first threshold value, is observed a second time. In this case, it is observed a second time that the tire is fully inflated a second time. This means that a tire change may have taken place and the available tire data can now be classified as unreliable or invalid. A corresponding value which marks the tire data as invalid is then assigned to the variable.

Alternatively or additionally, a drop in pressure can also be evaluated. For example, the occurrence of a pressure drop which exceeds a second threshold value can be monitored. This second threshold value can be selected, for example, in such a way that a complete loss of pressure is recognized. The occurrence of such a pressure drop can be noted in the memory of the tire pressure monitoring unit, for example, by setting a flag.

After a tire change, tire data can in principle be written into the tire pressure monitoring unit before or after the tire is inflated. When tire data are written into the tire pressure monitoring unit after a tire change before the first inflation, a second inflation, that is, a second pressure increase above the predetermined threshold value, is an indication of a possible tire change, so that existing tire data is to be identified as invalid or deleted.

When tire data are only written into the tire pressure monitoring unit after the first inflation when a tire is changed, the first critical pressure increase can already be based on the inflation of a new tire. In this case, however, the observed pressure increase must have been preceded by a critical pressure drop, since the old tire is deflated when a tire is changed. When, after writing tire data, a pressure drop that exceeds a second threshold value occurs, and after this pressure drop, a pressure increase that exceeds a (first) threshold value then occurs, a tire change may also have taken place, so that the tire data in the memory of the tire pressure monitoring unit is to be identified as invalid or deleted.

If tire data have been written into the tire pressure monitoring unit of an inflated tire, these tire data are recognized as invalid or deleted when a critical pressure drop and then a critical pressure increase are detected.

If, on the other hand, tire data were written into the tire pressure monitoring unit of a flat tire, these tire data are recognized as invalid or deleted when a critical pressure increase and then a further critical pressure increase are detected.

A critical pressure increase can be recognized when a first threshold value is exceeded, a critical pressure drop at a second limit value.

In reference to FIG. 1, a tire pressure monitoring unit 10 is for mounting on a vehicle wheel, having a sensor 12 for measuring the tire pressure, a transmitter 14 and a receiver 16 for wireless data transmission, a memory 18 for storing tire data, and a controller 20 connected to the sensor, the transmitter, the receiver and the memory.

The controller writes this tire data into the memory on receipt of tire data received via the receiver and assigns a value to a variable, the value marking this tire data as valid. It is provided that a necessary condition for the variable to be assigned a value which marks the tire data as invalid is that the controller detects a pressure increase that exceeds a predetermined threshold value. In addition, a corresponding method for managing tire data in a data memory of a tire pressure monitoring unit is described.

What is claimed is:

1. A tire pressure monitoring unit for mounting on a vehicle wheel, comprising:
   a sensor for measuring a tire pressure;
   a transmitter and a receiver configured for wireless data transmission;
   a memory for storing a tire data, the tire data comprising a tire type and/or a tire dimension; and
   a controller connected to the sensor, the transmitter, the receiver and the memory, the controller writing the tire data into the memory on receipt of the tire data received via the receiver and assigning a value to a variable, the value marking this tire data as valid;
   wherein a necessary condition for the variable being assigned a value which marks the tire data as invalid is that the controller detects a pressure increase which exceeds a predetermined threshold value.

2. The tire pressure monitoring unit according to claim 1, wherein the controller assigns a value to the variable, the value marking the tire data as invalid, when the pressure increase that exceeds the predetermined threshold value was preceded by a pressure drop that occurred after the tire data was written and exceeds a second predetermined threshold value.

3. The tire pressure monitoring unit according to claim 1, wherein the controller assigns a value to the variable, the value marking the tire data as invalid, when, after writing the tire data and after the pressure increase which exceeds the predetermined threshold value, a further pressure increase which exceeds the predetermined threshold is detected.

4. The tire pressure monitoring unit according to claim 1, wherein the memory is an electronic memory.

5. A method for managing a tire data in a data memory of a tire pressure monitoring unit, the method comprising the steps of:
   providing a sensor for measuring a tire pressure;

providing a transmitter and a receiver configured for wireless data transmission;

providing the data memory for storing the tire data, the tire data comprising a tire type and/or a tire dimension; and providing a controller connected to the sensor, the transmitter, the receiver and the data memory;

writing, via the controller, the tire data into the data memory of the tire pressure monitoring unit;

assigning, via the controller, a variable a value that indicates that the tire data is valid;

wherein the variable remains unchanged as long as no pressure increase which exceeds a predetermined threshold value is detected.

6. The method according to claim 5, wherein the occurrence of a pressure increase which exceeds a predetermined threshold value is noted in the data memory of the tire pressure monitoring unit, and a value by which tire data are marked as invalid is assigned to the variable when a pressure increase that exceeds the predetermined threshold value is detected a second time since the tire data was written.

7. The method according to claim 5, wherein after the tire data have been written, the occurrence of a pressure drop which exceeds a predetermined threshold value is noted in the data memory of the tire pressure monitoring unit, and a value by which tire data are marked as invalid is assigned to the variable when, after such a pressure drop, a pressure increase which exceeds the predetermined threshold value is detected.

* * * * *